(12) United States Patent
Smith et al.

(10) Patent No.: US 12,072,516 B2
(45) Date of Patent: Aug. 27, 2024

(54) OPTICAL DEVICE

(71) Applicant: VIAVI Solutions Inc., Chandler, AZ (US)

(72) Inventors: Valton Smith, Novato, CA (US); Michael Klimek, Santa Rosa, CA (US); Curtis R. Hruska, Cloverdale, CA (US)

(73) Assignee: VIAVI Solutions Inc., Chandler, AZ (US)

( * ) Notice: Subject to any disclaimer, the term of this patent is extended or adjusted under 35 U.S.C. 154(b) by 0 days.

(21) Appl. No.: 18/340,446

(22) Filed: Jun. 23, 2023

(65) Prior Publication Data

US 2023/0333295 A1    Oct. 19, 2023

Related U.S. Application Data

(63) Continuation of application No. 17/197,814, filed on Mar. 10, 2021, now Pat. No. 11,698,478.

(51) Int. Cl.
*G02B 5/20*     (2006.01)
*G01J 3/51*     (2006.01)
*G02B 7/00*     (2021.01)

(52) U.S. Cl.
CPC .............. *G02B 5/201* (2013.01); *G01J 3/51* (2013.01); *G02B 7/006* (2013.01)

(58) Field of Classification Search
CPC ....... G01J 2003/2806; G01J 2003/2813; G01J 2003/2826; G01J 3/2803; G01J 3/51; G02B 5/201; G02B 7/006

See application file for complete search history.

(56) References Cited

U.S. PATENT DOCUMENTS

| | | | |
|---|---|---|---|
| 2014/0184800 A1* | 7/2014 | Hirai | H01L 27/14621 348/148 |
| 2015/0288894 A1 | 10/2015 | Geelen et al. | |
| 2019/0078937 A1 | 3/2019 | Siddiqui et al. | |
| 2019/0387142 A1 | 12/2019 | Zhang et al. | |
| 2020/0141803 A1* | 5/2020 | Ahlberg | G01J 3/2823 |

(Continued)

FOREIGN PATENT DOCUMENTS

| | | |
|---|---|---|
| EP | 3112828 A1 | 1/2017 |
| EP | 3633334 A1 | 4/2020 |

OTHER PUBLICATIONS

Extended European Search Report for Application No. EP21192577.1, mailed on Feb. 21, 2022, 8 pages.

*Primary Examiner* — Hina F Ayub
(74) *Attorney, Agent, or Firm* — Harrity & Harrity, LLP (57) ABSTRACT

An optical device may include a plurality of sensor elements and a plurality of optical channels. The plurality of sensor elements may include a first set of sensor elements associated with a first wavelength range and a second set of sensor elements associated with a second wavelength range. The plurality of optical channels may include a first set of optical channels associated with the first wavelength range and a second set of optical channels associated with the second wavelength range. A first optical channel, of the first set of optical channels, may be disposed over a first sensor element, of the first set of sensor elements, and a second optical channel, of the second set of optical channels, may be disposed over a second sensor element, of the second set of sensor elements.

20 Claims, 6 Drawing Sheets

(56) References Cited

U.S. PATENT DOCUMENTS

| | | |
|---|---|---|
| 2022/0239870 A1 | 7/2022 | Inada et al. |
| 2022/0291430 A1 | 9/2022 | Smith et al. |
| 2022/0326081 A1 | 10/2022 | Houck |
| 2023/0170363 A1* | 6/2023 | Huang .................. G02B 5/201 257/432 |
| 2023/0194347 A1* | 6/2023 | Yang .................... G01J 3/2823 356/326 |

* cited by examiner

OPTICAL DEVICE

RELATED APPLICATION

This application is a continuation of U.S. patent application Ser. No. 17/197,814, filed Mar. 10, 2021 (now U.S. Pat. No. 11,698,478), which is incorporated herein by reference in its entirety.

BACKGROUND

An optical device may be utilized to capture information concerning light. For example, the optical device may capture information relating to a set of wavelengths associated with the light. The optical device may include a set of sensor elements (e.g., optical sensors, spectral sensors, and/or image sensors) that capture the information. For example, an array of sensor elements may be utilized to capture information relating to multiple wavelengths. The sensor element array may be associated with an optical filter. The optical filter may include one or more channels that respectively pass particular wavelengths to sensor elements of the sensor element array.

SUMMARY

In some implementations, an optical filter comprising: a first set of optical channels associated with a first wavelength range; and a second set of optical channels associated with a second wavelength range, wherein: a first optical channel, of the first set of optical channels, is configured to pass light associated with a subrange of the first wavelength range to a first sensor element of an optical sensor that is configured to detect light associated with the first wavelength range, and a second optical channel, of the second set of optical channels, is configured to pass light associated with a subrange of the second wavelength range to a second sensor element of the optical sensor that is configured to detect light associated with the second wavelength range.

In some implementations, an optical device comprising: a plurality of sensor elements that includes a first set of sensor elements associated with a first wavelength range and a second set of sensor elements associated with a second wavelength range; and a plurality of optical channels disposed over the plurality of sensor elements, wherein: the plurality of optical channels includes a first set of optical channels associated with the first wavelength range and a second set of optical channels associated with the second wavelength range, a first optical channel, of the first set of optical channels, is disposed over a first sensor element, of the first set of sensor elements, and a second optical channel, of the second set of optical channels, is disposed over a second sensor element, of the second set of sensor elements.

In some implementations, an optical system comprising: an optical sensor that includes a first set of sensor elements configured to detect light associated with a first wavelength range and a second set of sensor elements configured to detect light associated with a second wavelength range; and an optical filter that includes a first set of optical channels associated with the first wavelength range and a second set of optical channels associated with the second wavelength range, wherein: a first optical channel, of the first set of optical channels, is disposed over a first sensor element, of the first set of sensor elements, wherein the first optical channel is configured to pass light associated with a subrange of the first wavelength range to the first sensor element, and a second optical channel, of the second set of optical channels, is disposed over a second sensor element, of the second set of sensor elements, wherein the second optical channel is configured to pass light associated with a subrange of the second wavelength range to the second sensor element.

DETAILED DESCRIPTION

The following detailed description of example implementations refers to the accompanying drawings. The same reference numbers in different drawings may identify the same or similar elements. The following description uses a spectrometer as an example. However, the techniques, principles, procedures, and methods described herein may be used with any sensor, including but not limited to other optical sensors and spectral sensors.

A conventional optical device, such as a spectrometer, includes an optical sensor comprising a plurality of sensor elements fabricated from the same photoactive material. In this way, the sensor elements are configured to detect light associated with a particular wavelength range. For example, a standard InGaAs photoactive material may be used to fabricate sensor elements of an optical sensor so that the sensor elements are configured to detect light associated with a wavelength range of 1.0 micrometers (μm) to 1.6 μm.

In some cases, multiple photoactive materials may be used to fabricate sensor elements of an optical sensor. For example, a standard InGaAs photoactive material (e.g., associated with a wavelength range of 1.0 μm to 1.6 μm) may be used to fabricate a first set of sensor elements of the optical sensor, and an extended InGaAs (e.g., associated with a wavelength range of 1.6 μm to 2.5 μm) may be used to fabricate a second set of sensor elements of the optical sensor. Accordingly, the first set of sensor elements may be configured to detect light associated with a wavelength range of 1.0 μm to 1.6 μm, and the second set of sensor elements may be configured to detect light associated with a wavelength range of 1.6 μm to 2.5 μm. The optical sensor therefore may be configured to detect light associated with a wavelength range of 1.0 μm to 2.5 μm.

Complications arise, however, when using an optical filter with an optical sensor that utilizes sensor elements fabricated from multiple photoactive materials. In some cases, the sensor elements may be arranged such that a conventional optical filter cannot effectively filter light for the multiple wavelength ranges associated with the optical sensor.

For example, an optical sensor can include first sensor elements configured to detect light associated with a first wavelength range and second sensor elements configured to detect light associated with a second wavelength range, where the first sensor elements and the second sensor elements are distributed across a surface of the optical sensor. A conventional optical filter, such as linear variable filter (LVF), can be disposed over the optical sensor. The LVF (e.g., a wedged optical filter that has spectral properties that vary along a dimension of the optical filter) can pass light associated with the first wavelength range closer to a first end of the filter and can pass light associated with the second wavelength range closer to a second end of the filter. However, the LVF can only pass light associated with the first wavelength range to the sensor elements on the surface of the optical sensor that are closer to the first end of the LVF and can only pass light associated with the second wavelength range to the sensor elements on the surface of the optical sensor that are closer to the second end of the LVF. Therefore, the LVF does not pass light associated with the first wavelength range to at least some of the first sensor elements (e.g., first sensor elements closer to the second end of the LVF) and does not pass light associated with the second wavelength range to at least some of the second sensor elements (e.g., second sensor elements closer to the first end of the LVF). This inhibits an ability of the optical sensor to determine accurate information (e.g., spectral information) associated with light that falls incident on the optical sensor.

Some implementations described herein provide an optical device that comprises an optical sensor that includes a plurality of sensor elements and an optical filter that includes a plurality of optical channels. The plurality of sensor elements may include a first set of sensor elements associated with a first wavelength range (e.g., that are configured to detect light associated with the first wavelength range) and a second set of sensor elements associated with a second wavelength range (e.g., that are configured to detect light associated with the second wavelength range). The plurality of optical channels may include a first set of optical channels associated with the first wavelength range and a second set of optical channels associated with the second wavelength range. A first optical channel, of the first set of optical channels, may be disposed over a first sensor element, of the first set of sensor elements, and a second optical channel, of the second set of optical channels, may be disposed over a second sensor element, of the second set of sensor elements. The first optical channel may be configured to pass light associated with a subrange of the first wavelength range to the first sensor element, and the second optical channel may be configured to pass light associated with a subrange of the second wavelength range to the second sensor element. In some implementations, the first optical channels and the second optical channels are arranged in a pattern on a surface of the optical filter that corresponds to a pattern in which the first sensor elements and the second sensor elements are arranged on a surface of the optical sensor.

In this way, the first optical channels and the second optical channels pass light associated with particular subranges to respective sensor elements of the first sensor elements and the second sensor elements. The optical filter therefore improves an ability of the optical device to determine accurate information (e.g., spectral information) associated with light that falls incident on the optical device (e.g., because light associated with the particular subranges, when present, is passed to the respective sensor elements) as compared to a conventional optical device. Moreover, the arrangement pattern of the first optical channels and the second optical channels and the corresponding arrangement pattern of the first sensor elements and the second sensor elements may be configured to reduce optical cross talk associated with light that is passed by the first optical channels and the second optical channels, which further improves a performance of the optical device. Additionally, including the first optical channels and the second optical channels in a single, monolithic optical filter allows the optical filter to be used in configurations where using multiple conventional optical filters is not practicable (e.g., due to a form factor size of the multiple conventional optical filters).

Figure 1A:
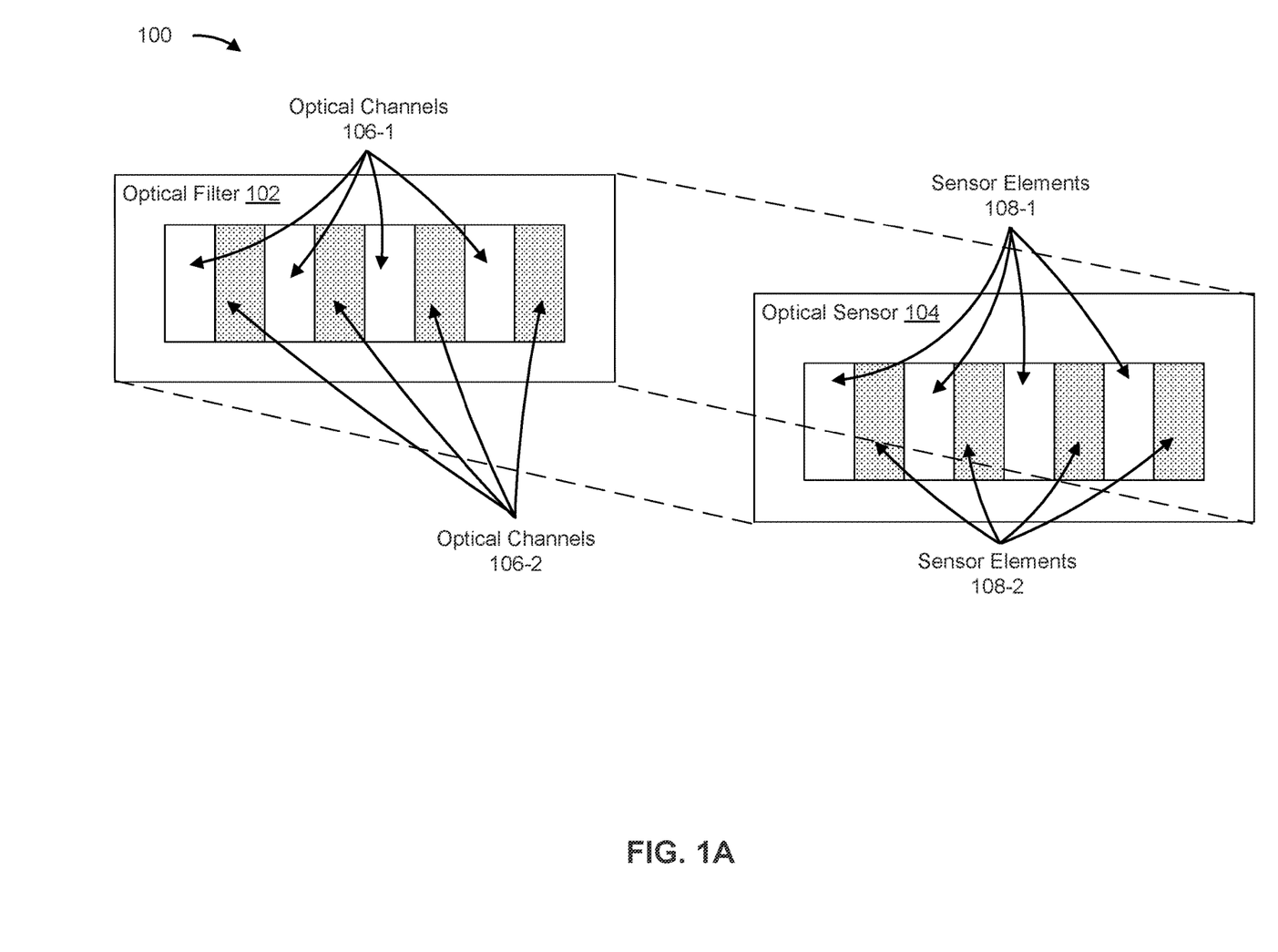
FIGS. 1A-1C are diagrams illustrating exploded top-down views of example implementations of an optical device described herein.
Figure 1B:
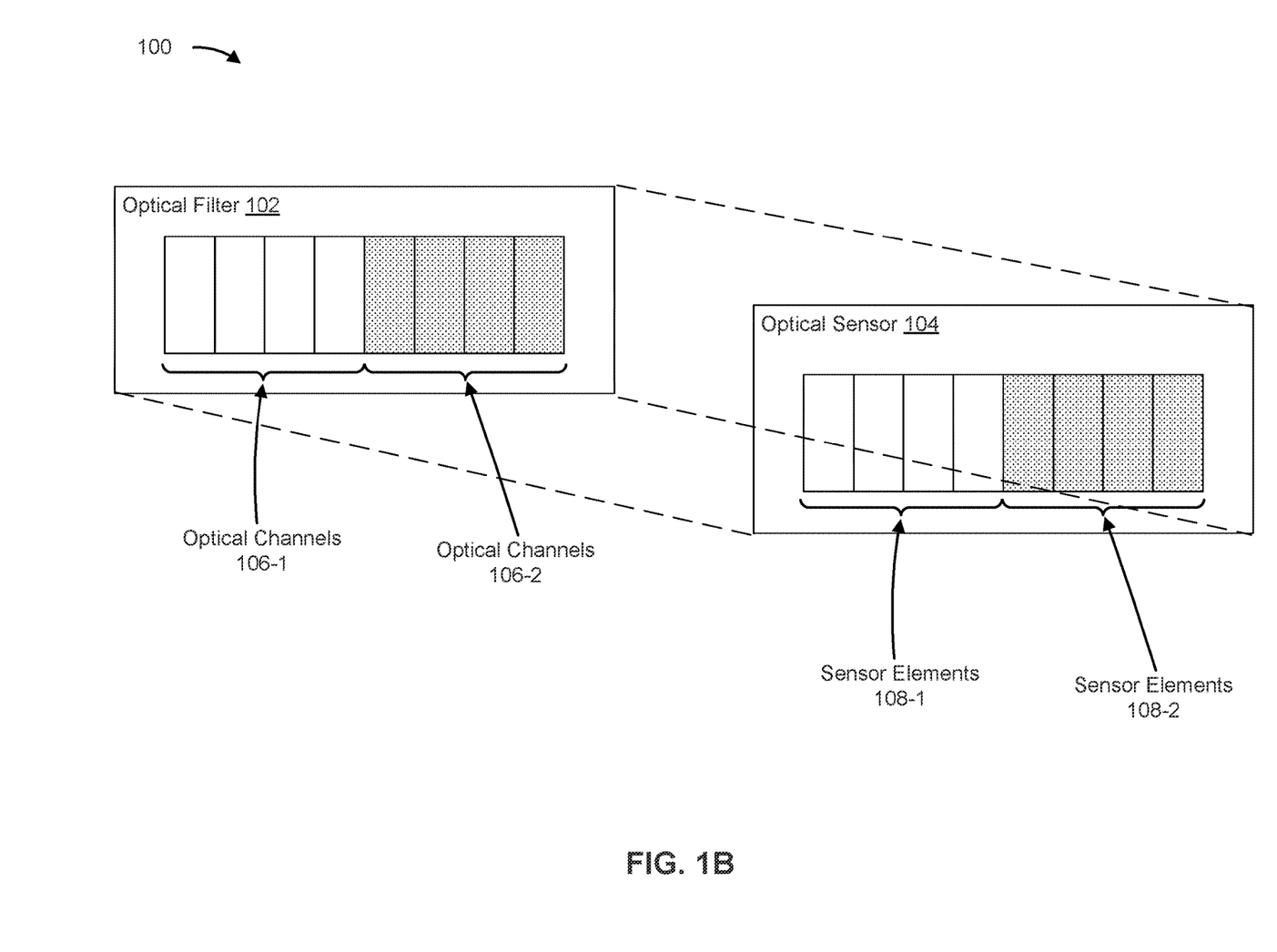
Figure 1C:
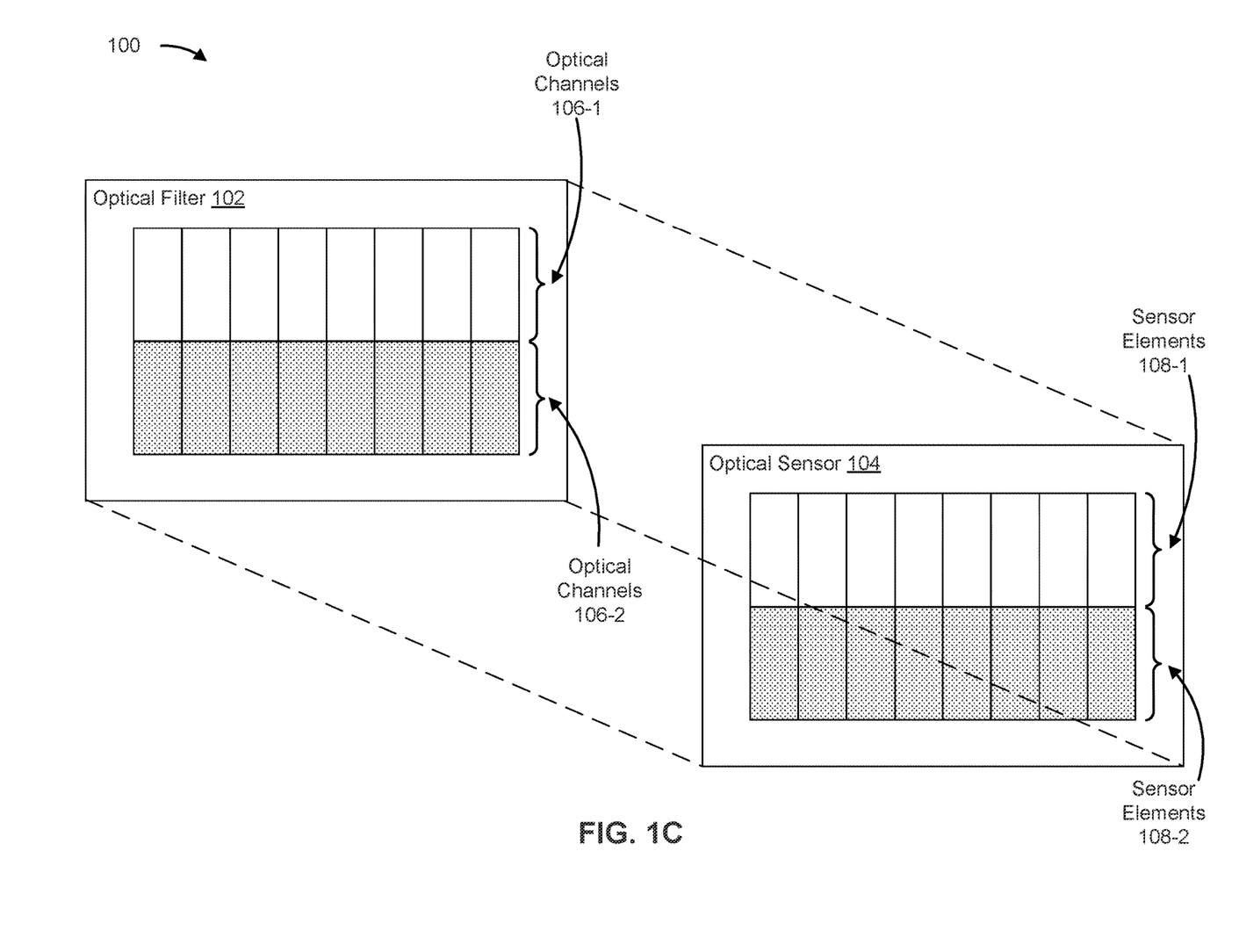

FIGS. 1A-1C are diagrams illustrating exploded top-down views of example implementations of an optical device 100 described herein. As shown in FIGS. 1A-1C, example optical device 100 may include an optical filter 102 and/or an optical sensor 104. As further shown in FIGS. 1A-1C, the optical filter 102 may include a plurality of optical channels 106 that respectively pass light in different wavelength ranges to a plurality of sensor elements 108 of the optical sensor 104. FIGS. 1A-1C show different configurations of the plurality of optical channels 106 on a surface (e.g., an input surface) of the optical filter 102 and the plurality of sensor elements 108 on a surface (e.g., an input surface) of the optical sensor 104, as described in more detail below.

As further shown in FIGS. 1A-1C, the plurality of optical channels 106 may include a set of optical channels 106-1 (e.g., indicated by no shading) and a set of optical channels 106-2 (e.g., indicated by gray shading). Moreover, the plurality of sensor elements 108 may include a set of sensor elements 108-1 (e.g., indicated by no shading) and a set of sensor elements 108-2 (e.g., indicated by gray shading). The set of optical channels 106-1 and the set of sensor elements 108-1 may be associated with a first wavelength range. The set optical channels 106-2 and the set of sensor elements 108-2 may be associated with a second wavelength range. For example, an optical channel 106-1, of the set of optical channels 106-1, may be configured to pass light associated with a subrange of the first wavelength range to a sensor element 108-1, of the set of sensor elements 108-1, that is configured to detect light associated with the first wavelength range. As another example, an optical channel 106-2, of the set of optical channels 106-2, may be configured to pass light associated with a subrange of the second wavelength range to a sensor element 108-2, of the set of sensor elements 108-2, that is configured to detect light associated with the second wavelength range. The first wavelength range and the second wavelength range may be different from each other (e.g., each wavelength range may have a different lower range bound and a different upper range bound).

In some implementations, an optical channel 106, of the plurality of optical channels 106, may comprise one or more layers (e.g., one or more epitaxial layers). The optical channel 106 may include at least one layer configured to pass light associated with a subrange of a wavelength range and/or configured to block light associated with a subrange of a wavelength range. For example, an optical channel 106-1, of the set of optical channels 106-1, may comprise at least one layer configured to pass light associated with a first subrange of a first wavelength range and/or configured to block light associated with a second subrange (e.g., that is different that the first subrange) of the first wavelength range (e.g., to cause the optical channel 106-1 to pass light associated with the first subrange of the first wavelength range and to not pass light associated with the second subrange of the first wavelength range). In a similar example, an optical channel 106-2, of the set of optical channels 106-2, may comprise at least one layer configured to pass light associated with a first subrange of a second wavelength range (e.g., that is different than the first wavelength range) and/or configured to block light associated with a second subrange (e.g., that is different that the first subrange) of the first wavelength range (e.g., to cause the optical channel 106-2 to pass light associated with the first subrange of the second wavelength range and to not pass light associated with the second subrange of the second wavelength range). In some implementations, the optical channel 106-1 may comprise a set of layers that is different (e.g., that has a different type of layers, a different number of layers, a different height, and/or a different thickness of individual layers, among other examples) than a set of layers of the optical channel 106-2. Accordingly, a composition of the optical channel 106-1 may be different than a composition of the optical channel 106-2. Additionally, or alternatively, individual optical channels 106-1, of the set of optical channels 106-1, may have a different composition than other optical channels 106-1 (e.g., to cause the individual optical channels 106-1 to pass and/or block light associated with different subranges of the first wavelength range) and/or individual optical channels 106-2, of the set of optical channels 106-2, may have a different composition than other optical channels 106-2 (e.g., to cause the individual optical channels 106-2 to pass and/or block light associated with different subranges of the second wavelength range).

In some implementations, the optical filter 102 may be disposed over the optical sensor 104 (e.g., after the optical filter 102 and the optical sensor 104 are assembled to form the optical device 100). Accordingly, the plurality of optical channels 106 may be disposed over the plurality of sensor elements 108. In some implementations the plurality of optical channels 106 may be disposed over the plurality of sensor elements 108 in a pattern to cause an optical channel 106-1, of the set of optical channels 106-1, to be disposed over a sensor element 108-1, of the set of sensor elements 108-1, and/or an optical channel 106-2, of the set of optical channels 106-2, to be disposed over a sensor element 108-2, of the set of sensor elements 108-2.

For example, as shown in FIG. 1A, the set of optical channels 106-1 and the set of optical channels 106-2 may be arranged in an alternating, one-dimensional pattern (e.g., in a row of optical channels 106 on a surface of the optical filter 102). As further shown in FIG. 1A, the set of sensor elements 108-1 and the set of sensor elements 108-2 may be arranged in a corresponding alternating, one-dimensional pattern (e.g., in a row of sensor elements 108 on a surface of the optical sensor 104). Accordingly, as shown in FIG. 1A, at least one optical channel 106-1, of the set of optical channels 106-1, may be disposed over a corresponding sensor element 108-1, of the set of sensor elements 108-1, and/or at least one optical channel 106-2, of the set of optical channels 106-2, may be disposed over a corresponding sensor element 108-2, of the set of sensor elements 108-2 (e.g., after the optical filter 102 and the optical sensor 104 are assembled to form the optical device 100).

In an additional example, as shown in FIG. 1B, the set of optical channels 106-1 and the set of optical channels 106-2 may be arranged in a consolidated, one-dimensional pattern (e.g., in a row of optical channels 106 on a surface of the optical filter 102) where the set of optical channels 106-1 may be arranged on one side of the row of optical channels 106 (e.g., shown as the left side of the row in FIG. 1B), and the optical channels 106-2 may be arranged on an opposite side of the row (e.g., shown as the right side of the row in FIG. 1B). As further shown in FIG. 1B, the set of sensor elements 108-1 and the set of sensor elements 108-2 may be arranged in a corresponding consolidated, one-dimensional pattern (e.g., in a row of sensor elements 108 on a surface of the optical sensor 104) where the set of sensor elements 108-1 may be arranged on one side of the row of sensor elements 108 (e.g., shown as the left side of the row in FIG. 1B), and the sensor elements 108-2 may be arranged on an opposite side of the row (e.g., shown as the right side of the row in FIG. 1B). Accordingly, as shown in FIG. 1B, at least one optical channel 106-1, of the set of optical channels 106-1, may be disposed over a corresponding sensor element 108-1, of the set of sensor elements 108-1, and/or at least one optical channel 106-2, of the set of optical channels 106-2, may be disposed over a corresponding sensor element 108-2, of the set of sensor elements 108-2 (e.g., after the optical filter 102 and the optical sensor 104 are assembled to form the optical device 100).

As another example, as shown in FIG. 1C, the set of optical channels 106-1 and the set of optical channels 106-2 may be arranged in a consolidated, two-dimensional pattern (e.g., in two adjacent rows of optical channels 106 on a surface of the optical filter 102) where the set of optical channels 106-1 may be arranged in a first row of the optical channels 106 (e.g., shown as a top row in FIG. 1C), and the set of optical channels 106-2 may be arranged in a second row of the optical channels 106 that is adjacent to the first row (e.g., shown as a bottom row in FIG. 1C). As further shown in FIG. 1C, the set of sensor elements 108-1 and the set of sensor elements 108-2 may be arranged in a corresponding consolidated, two-dimensional pattern (e.g., two adjacent rows of sensor elements 108 on a surface of the optical sensor 104) where the set of sensor elements 108-1 may be arranged in a first row of the sensor elements 108 (e.g., shown as a top row in FIG. 1C), and the set of sensor elements 108-2 may be arranged in a second row of the sensor elements 108 that is adjacent to the first row (e.g., shown as a bottom row in FIG. 1C). Accordingly, as shown in FIG. 1C, at least one optical channel 106-1, of the set of optical channels 106-1, may be disposed over a corresponding sensor element 108-1, of the set of sensor elements 108-1, and/or at least one optical channel 106-2, of the set of optical channels 106-2, may be disposed over a corresponding sensor element 108-2, of the set of sensor elements 108-2 (e.g., after the optical filter 102 and the optical sensor 104 are assembled to form the optical device 100).

As indicated above, FIGS. 1A-1C are provided merely as one or more examples. Other examples may differ from what is described with regard to FIGS. 1A-1C.

Figure 2:
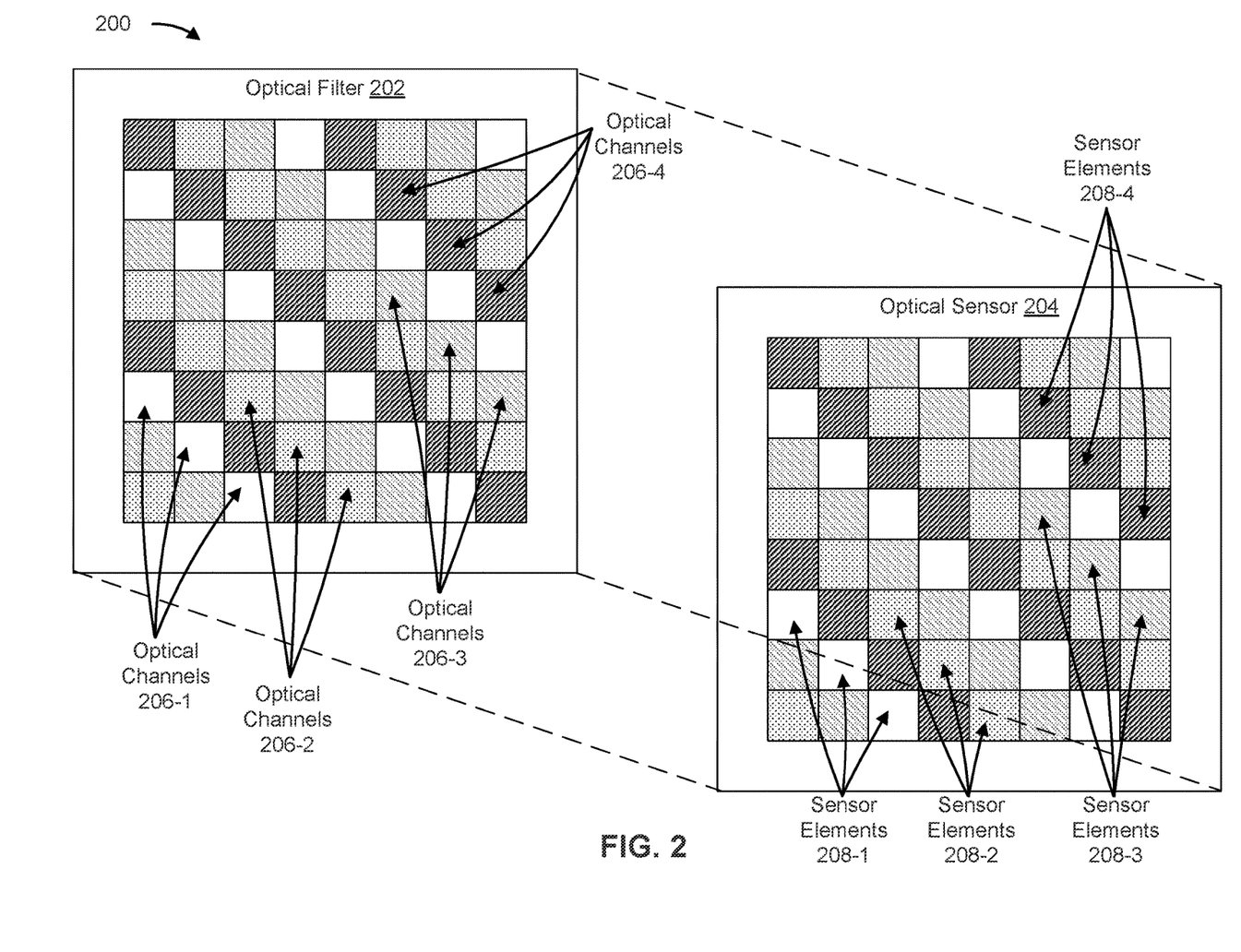
FIG. 2 is a diagram illustrating an exploded top-down view of an example implementation of an optical device described herein.

FIG. 2 is a diagram illustrating an exploded top-down view of an example implementation of an optical device 200 described herein. As shown in FIG. 2, example optical device 200 may include an optical filter 202 and/or an optical sensor 204. As further shown in FIG. 2, the optical filter 202 may include a plurality of optical channels 206 that respectively pass light in different wavelength ranges to a plurality of sensor elements 208 of the optical sensor 204. The optical filter 202, the optical sensor 204, the plurality of optical channels 206, and/or the plurality of sensor elements 208 may respectively be the same as, or similar to, the optical filter 102, the optical sensor 104, the plurality of optical channels 106, and/or the plurality of sensor elements 108 described herein in relation to FIGS. 1A-1C.

In some implementations, the plurality of optical channels 206 may include a plurality of sets of optical channels 206 that are respectively associated with different wavelength ranges of light. For example, as shown in FIG. 2, the plurality of optical channels 206 may include a set of optical channels 206-1 (e.g., indicated by no shading) associated with a first wavelength range, a set of optical channels 206-2

(e.g., indicated by gray shading) associated with a second wavelength range, a set of optical channels 206-3 (e.g., indicated by a left-to-right diagonal pattern) associated with a third wavelength range, and a set of optical channels 206-4 (e.g., indicated by a right-to-left diagonal pattern) associated with a fourth wavelength range. The first wavelength range, the second wavelength range, the third wavelength range, and the fourth wavelength range may be different from each other (e.g., each wavelength range may have a different lower range bound and a different upper range bound). Moreover, the plurality of sensor elements 208 may include a plurality of sets of sensor elements 208 that are respectively associated with different wavelength ranges of light. For example, the plurality of sensor elements 208 may include a set of sensor elements 208-1 (e.g., indicated by no shading) associated with the first wavelength range, a set of sensor elements 208-2 (e.g., indicated by gray shading) associated with the second wavelength range, a set of sensor elements 208-3 (e.g., indicated by a left-to-right diagonal pattern) associated with the third wavelength range, and a set of sensor elements 208-4 (e.g., indicated by a right-to-left diagonal pattern) associated with the fourth wavelength range.

In some implementations, a particular set of optical channels 206, of the plurality of sets of optical channels 206, may be configured to pass light associated with one or more subranges of a wavelength range to a particular set of sensor elements 208, of the plurality of sets of sensor elements 208, that may be configured to detect light associated with the wavelength range. For example, an optical channel 206-1, of the set of optical channels 206-1, may be configured to pass light associated with a subrange of the first wavelength range to a sensor element 208-1, of the set of sensor elements 208-1, that is configured to detect light associated with the first wavelength range; an optical channel 206-2, of the set of optical channels 206-2, may be configured to pass light associated with a subrange of the second wavelength range to a sensor element 208-2, of the set of sensor elements 208-2, that is configured to detect light associated with the second wavelength range; an optical channel 206-3, of the set of optical channels 206-3, may be configured to pass light associated with a subrange of the third wavelength range to a sensor element 208-3, of the set of sensor elements 208-3, that is configured to detect light associated with the third wavelength range; and/or an optical channel 206-4, of the set of optical channels 206-4, may be configured to pass light associated with a subrange of the fourth wavelength range to a sensor element 208-4, of the set of sensor elements 208-4, that is configured to detect light associated with the fourth wavelength range.

In some implementations, the optical filter 202 may be disposed over the optical sensor 204 (e.g., after the optical filter 202 and the optical sensor 204 are assembled to form the optical device 200). Accordingly, the plurality of optical channels 206 may be disposed over the plurality of sensor elements 208. In some implementations the plurality of optical channels 206 may be disposed over the plurality of sensor elements 208 to cause an optical channel 206 that is associated with a particular wavelength range to be disposed over a sensor element 208 associated with the particular wavelength range. For example, the plurality of optical channels 206 may be disposed over the plurality of sensor elements 208 to cause an optical channel 206-1, of the set of optical channels 206-1, to be disposed over a sensor element 208-1, of the set of sensor elements 208-1; an optical channel 206-2, of the set of optical channels 206-2, to be disposed over a sensor element 208-2, of the set of sensor elements 208-2; an optical channel 206-3, of the set of optical channels 206-3, to be disposed over a sensor element 208-3, of the set of sensor elements 208-3; and/or an optical channel 206-4, of the set of optical channels 206-4, to be disposed over a sensor element 208-4, of the set of sensor elements 208-4.

In some implementations, the plurality of sets of optical channels 206 may be arranged in a uniform pattern (e.g., on a surface of the optical filter 202), and the plurality of sets of sensor elements 208 may be may be arranged in a corresponding uniform pattern (e.g., on a surface of the optical sensor 204). For example, as shown in FIG. 2, the plurality of sets of optical channels 206 may be arranged in a uniform, two-dimensional pattern (e.g., a uniform checkered pattern, where an optical channel 206 of a particular set of optical channels 206 is positioned at every fourth location along a row and column of an array of optical channels 206), and the plurality of sets of sensor elements 208 may be arranged in a corresponding uniform, two-dimensional pattern (e.g., a uniform checkered pattern, where a sensor element 208 of a particular set of sensor elements 208 is positioned at every fourth location along a row and column of an array of sensor elements 208). Accordingly, at least one optical channel 206-1, of the set of optical channels 206-1, may be disposed over a corresponding sensor element 208-1, of the set of sensor elements 208-1; at least one optical channel 206-2, of the set of optical channels 206-2, may be disposed over a corresponding sensor element 208-2, of the set of sensor elements 208-2; at least one optical channel 206-3, of the set of optical channels 206-3, may be disposed over a corresponding sensor element 208-3, of the set of sensor elements 208-3; and/or at least one optical channel 206-4, of the set of optical channels 206-4, may be disposed over a corresponding sensor element 208-4, of the set of sensor elements 208-4 (e.g., after the optical filter 202 and the optical sensor 204 are assembled to form the optical device 200).

While FIG. 2 shows uniform, two-dimensional checkered patterns for the optical channels 206 and the sensor elements 208, other uniform patterns are contemplated, such as uniform, one-dimensional patterns (e.g., as shown in FIGS. 1A-1B), other uniform, two-dimensional patterns (e.g., as shown in FIG. 1C), or uniform spiral patterns (e.g., where optical channels 206 of a particular set of optical channels 206 are positioned at regular locations on a surface of the optical filter 202 and sensor elements 208 of a particular set of sensor elements 208 are positioned at regular locations on a surface of the optical sensor 204), among other examples.

As indicated above, FIG. 2 is provided merely as one or more examples. Other examples may differ from what is described with regard to FIG. 2.

Figure 3:
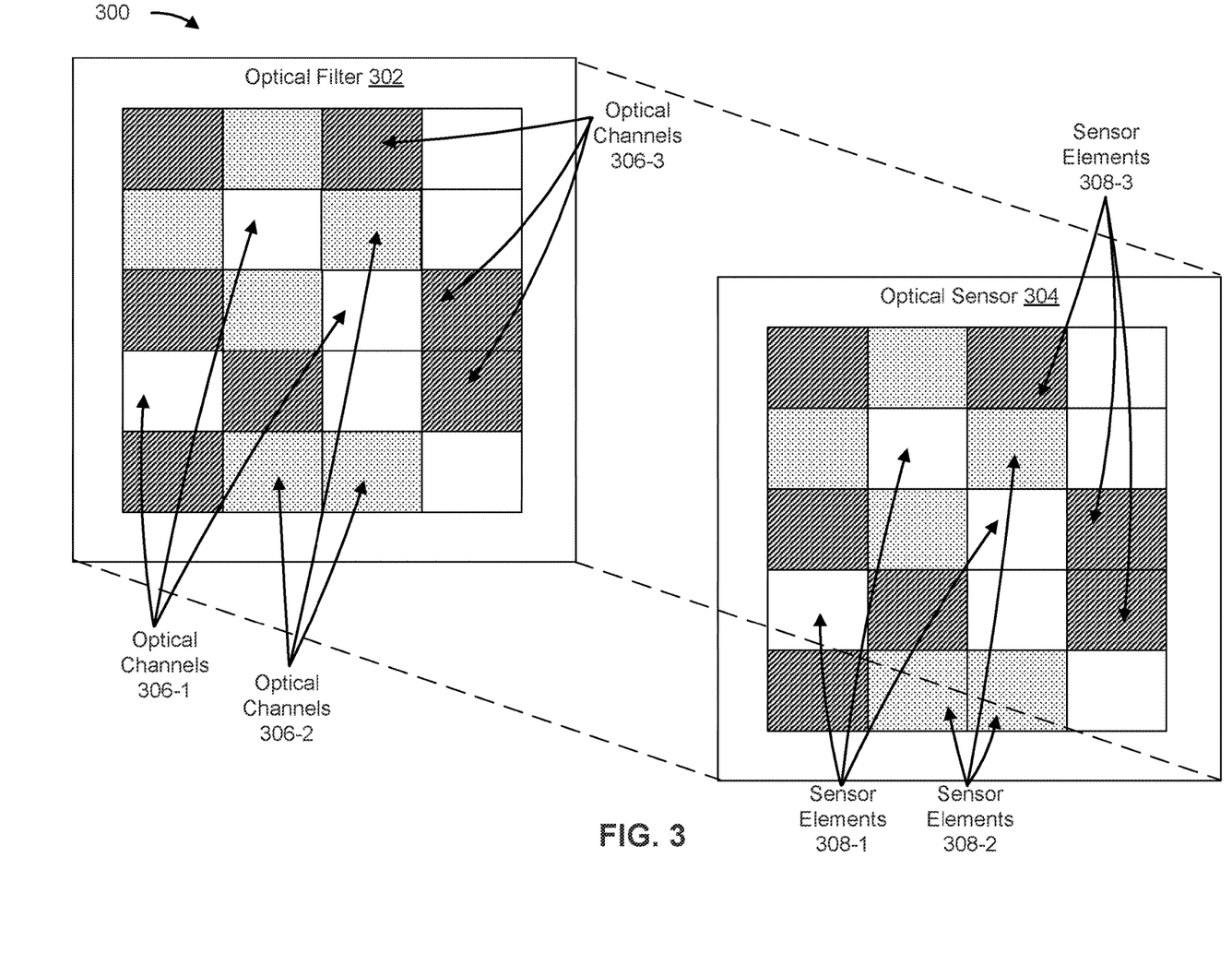
FIG. 3 is a diagram illustrating an exploded top-down view of an example implementation of an optical device described herein.

FIG. 3 is a diagram illustrating an exploded top-down view of an example optical device 300 described herein. As shown in FIG. 3, example optical device 300 may include an optical filter 302 and/or an optical sensor 304. As further shown in FIG. 3, the optical filter 302 may include a plurality of optical channels 306 that respectively pass light in different wavelength ranges to a plurality of sensor elements 308 of the optical sensor 304. The optical filter 302, the optical sensor 304, the plurality of optical channels 306, and/or the plurality of sensor elements 308 may respectively be the same as, or similar to, the optical filter 102, the optical sensor 104, the plurality of optical channels 106, and/or the plurality of sensor elements 108 described herein in relation to FIGS. 1A-1C.

In some implementations, the plurality of optical channels 306 may include a plurality of sets of optical channels 306 that are respectively associated with different wavelength ranges of light. For example, as shown in FIG. 3, the plurality of optical channels 306 may include a set of optical channels 306-1 (e.g., indicated by no shading) associated with a first wavelength range, a set of optical channels 306-2 (e.g., indicated by gray shading) associated with a second wavelength range, a set of optical channels 306-3 (e.g., indicated by a right-to-left diagonal pattern) associated with a third wavelength range. The first wavelength range, the second wavelength range, and the third wavelength range may be different from each other (e.g., each wavelength range may have a different lower range bound and a different upper range bound). Moreover, the plurality of sensor elements 308 may include a plurality of sets of sensor elements 308 that are respectively associated with different wavelength ranges of light. For example, the plurality of sensor elements 308 may include a set of sensor elements 308-1 (e.g., indicated by no shading) associated with the first wavelength range, a set of sensor elements 308-2 (e.g., indicated by gray shading) associated with the second wavelength range, a set of sensor elements 308-3 (e.g., indicated by a right-to-left diagonal pattern) associated with the third wavelength range.

In some implementations, a particular set of optical channels 306, of the plurality of sets of optical channels 306, may be configured to pass light associated with one or more subranges of a wavelength range to a particular set of sensor elements 308, of the plurality of sets of sensor elements 308, that may be configured to detect light associated with the wavelength range. For example, an optical channel 306-1, of the set of optical channels 306-1, may be configured to pass light associated with a subrange of the first wavelength range to a sensor element 308-1, of the set of sensor elements 308-1, that is configured to detect light associated with the first wavelength range; an optical channel 306-2, of the set of optical channels 306-2, may be configured to pass light associated with a subrange of the second wavelength range to a sensor element 308-2, of the set of sensor elements 308-2, that is configured to detect light associated with the second wavelength range; and/or an optical channel 306-3, of the set of optical channels 306-3, may be configured to pass light associated with a subrange of the third wavelength range to a sensor element 308-3, of the set of sensor elements 308-3, that is configured to detect light associated with the third wavelength range.

In some implementations, the optical filter 302 may be disposed over the optical sensor 304 (e.g., after the optical filter 302 and the optical sensor 304 are assembled to form the optical device 300). Accordingly, the plurality of optical channels 306 may be disposed over the plurality of sensor elements 308. In some implementations the plurality of optical channels 306 may be disposed over the plurality of sensor elements 308 to cause an optical channel 306 that is associated with a particular wavelength range to be disposed over a sensor element 308 associated with the particular wavelength range. For example, the plurality of optical channels 306 may be disposed over the plurality of sensor elements 308 to cause an optical channel 306-1, of the set of optical channels 306-1, to be disposed over a sensor element 308-1, of the set of sensor elements 308-1; an optical channel 306-2, of the set of optical channels 306-2, to be disposed over a sensor element 308-2, of the set of sensor elements 308-2; and/or an optical channel 306-3, of the set of optical channels 306-3, to be disposed over a sensor element 308-3, of the set of sensor elements 308-3.

In some implementations, the plurality of sets of optical channels 306 may be arranged in a non-uniform pattern (e.g., on a surface of the optical filter 302), and the plurality of sets of sensor elements 308 may be may be arranged in a corresponding non-uniform pattern (e.g., on a surface of the optical sensor 304). For example, as shown in FIG. 3, the plurality of sets of optical channels 306 may be arranged in a non-uniform, two-dimensional pattern (e.g., a non-uniform grid pattern, where optical channels 306 of a particular set of optical channels 306 are positioned at non-regular locations along a row and column of an array of optical channels 306), and the plurality of sets of sensor elements 308 may be arranged in a corresponding non-uniform, two-dimensional grid pattern (e.g., a non-uniform grid pattern, where sensor elements 308 of a particular set of sensor elements 308 are positioned at non-regular locations along a row and column of an array of sensor elements 308). Accordingly, at least one optical channel 306-1, of the set of optical channels 306-1, may be disposed over a corresponding sensor element 308-1, of the set of sensor elements 308-1; at least one optical channel 306-2, of the set of optical channels 306-2, may be disposed over a corresponding sensor element 308-2, of the set of sensor elements 308-2; and/or at least one optical channel 306-3, of the set of optical channels 306-3, may be disposed over a corresponding sensor element 308-3, of the set of sensor elements 308-3 (e.g., after the optical filter 302 and the optical sensor 304 are assembled to form the optical device 300).

While FIG. 3 shows non-uniform, two-dimensional grid patterns for the optical channels 306 and the sensor elements 308, other non-uniform patterns are contemplated, such as non-uniform, one-dimensional patterns, other non-uniform, two-dimensional patterns, or non-uniform "random" or pseudorandom patterns (e.g., where optical channels 306 of a particular set of optical channels 306 are positioned at non-regular locations on a surface of the optical filter 302 and sensor elements 308 of a particular set of sensor elements 308 are positioned at non-regular locations on a surface of the optical sensor 304), among other examples.

As indicated above, FIG. 3 is provided merely as one or more examples. Other examples may differ from what is described with regard to FIG. 3.

Figure 4A:
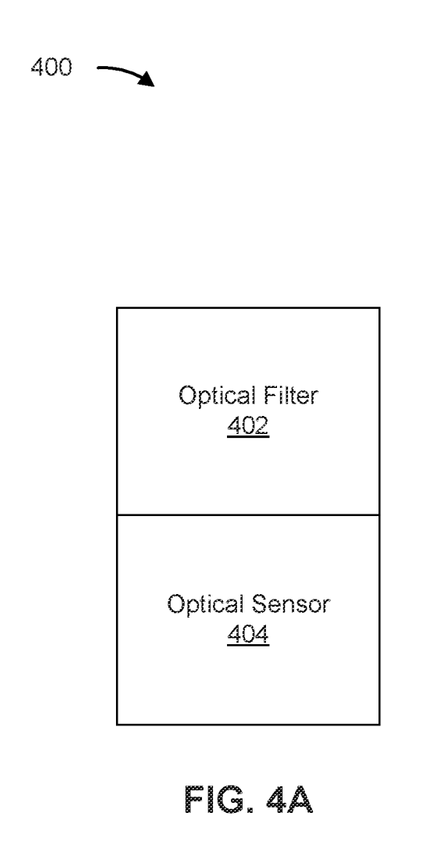
FIGS. 4A-4C are diagrams illustrating side views of example implementations of an optical system described herein.
Figure 4B:
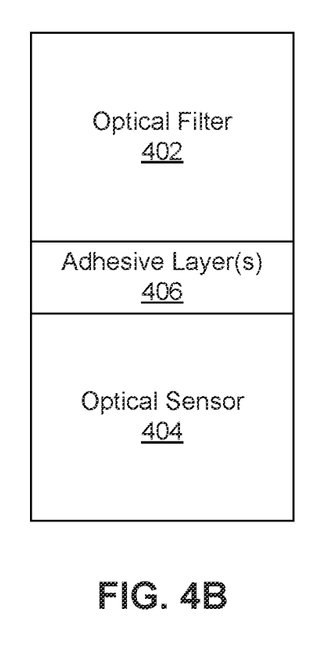
Figure 4C:
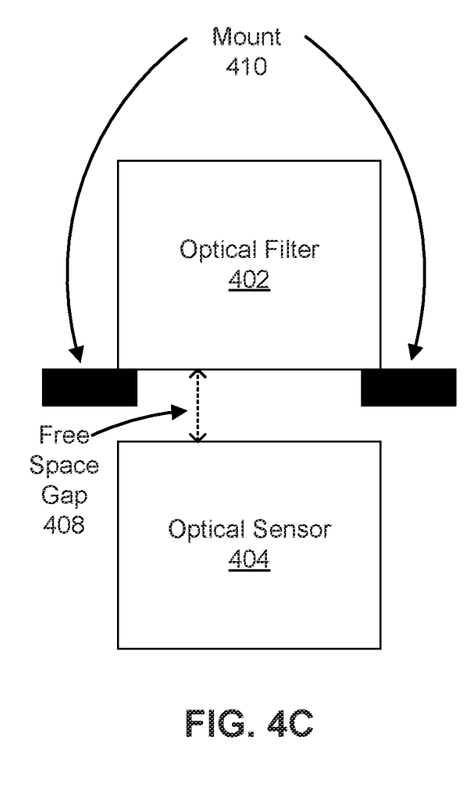

FIGS. 4A-4C are diagrams illustrating side views of example implementations of an optical system 400 described herein. As shown in FIGS. 4A-4C, the optical system 400 may include an optical filter 402 (e.g., that corresponds to the optical filters 102, 202, and/or 302 described above) and an optical sensor 404 (e.g., the corresponds to the optical sensors 104, 204, and/or 304 described above). In some implementations, the optical filter 402 may be disposed directly (e.g., coated directly) on the optical sensor 404. For example, as shown in FIG. 4A, a surface (e.g., a bottom surface as shown in FIG. 4A) of the optical filter 402 may be disposed on a surface (e.g., a top surface as shown in FIG. 4A) of the optical sensor 404.

In some implementations, the optical filter 402 may be disposed on the optical sensor 404 via one or more layers, such as one or more adhesive layers 406. For example, as shown in FIG. 4B, a surface (e.g., a bottom surface as shown in FIG. 4B) of the optical filter 402 may be disposed on a surface (e.g., a top surface as shown in FIG. 4B) of the one or more adhesive layers 406, and a different surface (e.g., a bottom surface as shown in FIG. 4B) of the one or more adhesive layers may be disposed on a surface (e.g., a top surface as shown in FIG. 4B) of the optical sensor 404. The one or more adhesive layers 406 may comprise one or more layers (e.g., one or more epitaxial layers) that are configured to adhere to the optical filter 402 and/or the optical sensor 404. In this way, the one or more adhesive layers 406 may be configured to maintain a structural integrity (e.g., cause the optical filter 402 to be disposed over the optical sensor 404) of the optical system 400 during assembly and/or operation of the optical system 400.

In some implementations, the optical filter 402 may be disposed over the optical sensor 404 via a free space gap 408. For example, as shown in FIG. 4C, a mount 410 may hold the optical filter 402 over the optical sensor 404 and thereby cause a surface (e.g., a bottom surface as shown in FIG. 4C) of the optical filter 402 and a surface (e.g., a top surface as shown in FIG. 4C) the optical sensor 404 to be separated by the free space gap 408. In this way, the mount 410 may be configured to maintain a structural integrity (e.g., cause the optical filter 402 to be disposed over the optical sensor 404 and/or for the free space gap 408 to be maintained between the optical filter 402 and the optical sensor 404) of the optical system 400 during assembly and/or operation of the optical system 400.

Additional configurations of the optical system 400 are also contemplated. For example, a first portion (e.g., a lower portion comprising one or more layers) of the optical filter 402 may be disposed directly (e.g., coated directly) on the optical sensor 404 and a second portion of the of the optical sensor 404 (e.g., an upper portion comprising one or more layers) may be disposed on the first portion of the optical filter 402 via one or more layers, such as one or more adhesive layers 406, or the second portion of the optical sensor 404 may be disposed over the first portion of the optical filter 402 via the mount 410 (which causes a surface of the first portion of the optical filter 402 and a surface of the second portion of the optical filter 402 to be separated by the free space gap 408). Further, one or more additional coatings, such as anti-reflective coatings, may be directly disposed on the optical filter 402 (e.g., the first portion of the optical filter 402 and/or the second portion of the optical filter 402) and/or the optical sensor 404.

As indicated above, FIGS. 4A-4C are provided as an example. Other examples may differ from what is described with regard to FIGS. 4A-4C.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of"). Further, spatially relative terms, such as "below," "lower," "bottom," "above," "upper," "top," and the like, may be used herein for ease of description to describe one element or feature's relationship to another element(s) or feature(s) as illustrated in the figures. The spatially relative terms are intended to encompass different orientations of the apparatus, device, and/or element in use or operation in addition to the orientation depicted in the figures. The apparatus may be otherwise oriented (rotated 90 degrees or at other orientations) and the spatially relative descriptors used herein may likewise be interpreted accordingly.

What is claimed is:

1. An optical filter comprising:
   a row of optical channels including:
      a first set of optical channels associated with a first wavelength range; and
      a second set of optical channels associated with a second wavelength range,
         the optical filter including only one row of optical channels,
         the row of optical channels being the one row of optical channels,
         the first set of optical channels and the second set of optical channels being arranged in one of:
            an alternating, one-dimensional pattern, or
            a consolidated, one-dimensional pattern,
         a first optical channel, of the first set of optical channels, being configured to pass first light to a first sensor element, and
         a second optical channel, of the second set of optical channels, being configured to pass second light to a second sensor element.

2. The optical filter of claim 1, wherein:
   the first optical channel comprises at least one layer that is configured to:
      pass the first light,
         wherein the first light is associated with a subrange of the first wavelength range; or
      block third light associated with a different subrange of the first wavelength range.

3. The optical filter of claim 1, wherein:
the first optical channel comprises a first set of layers;
the second optical channel comprises a second set of layers; and
a number of layers of the first set of layers is different than a number of layers of the second set of layers.

4. The optical filter of claim 1, wherein a composition of the first optical channel is different than a composition of the second optical channel.

5. The optical filter of claim 1, wherein the first set of optical channels and the second set of optical channels are arranged in the alternating, one-dimensional pattern.

6. The optical filter of claim 1, wherein the first set of optical channels and the second set of optical channels are arranged in the consolidated, one-dimensional pattern,
wherein the first set of optical channels are arranged on a first side of the row, and
wherein the second set of optical channels are arranged on a second side of the row.

7. The optical filter of claim 1, wherein the first sensor element and the second sensor element are in an optical sensor, and
wherein the optical sensor is configured to detect light associated with the first wavelength range and detect light associated with the second wavelength range,
wherein the first light is associated with a subrange of the first wavelength range, and
wherein the second light is associated with a subrange of the second wavelength range.

8. An optical device comprising:
a row of sensor elements that includes a first set of sensor elements associated with a first wavelength range and a second set of sensor elements associated with a second wavelength range; and
an optical filter including a row of optical channels disposed over the row of sensor elements,
the optical filter including only a single row of optical channels,
the row of optical channels being the single row of optical channels,
the row of optical channels including a first set of optical channels associated with the first wavelength range and a second set of optical channels associated with the second wavelength range,
the first set of optical channels and the second set of optical channels being arranged in one of:
an alternating, one-dimensional pattern, or
a consolidated, one-dimensional pattern,
a first optical channel, of the first set of optical channels, is disposed over at least one first sensor element, of the first set of sensor elements, and
a second optical channel, of the second set of optical channels, is disposed over at least one second sensor element, of the second set of sensor elements.

9. The optical device of claim 8, wherein:
the at least one first sensor element is configured to detect light associated with the first wavelength range; and
the first optical channel is configured to pass light associated with a subrange of the first wavelength range to the at least one first sensor element.

10. The optical device of claim 8, wherein:
the first optical channel is configured to pass first light associated with a subrange of the first wavelength range to the at least one first sensor element; and
the second optical channel is configured to pass second light associated with a subrange of the second wavelength range to the at least one second sensor element.

11. The optical device of claim 8, wherein the row of optical channels are directly disposed on the row of sensor elements.

12. The optical device of claim 8, wherein the first set of optical channels and the second set of optical channels are arranged in the alternating, one-dimensional pattern, and
wherein the first set of sensor elements and the second set of sensor elements are arranged in a corresponding alternating, one-dimensional pattern that corresponds to the alternating, one-dimensional pattern.

13. The optical device of claim 8,
wherein each of the first set of optical channels is disposed over at least one corresponding sensor element of the first set of sensor elements, and
wherein each of the second set of optical channels is disposed over at least one corresponding sensor element of the second set of sensor elements.

14. The optical device of claim 8, wherein the first set of optical channels and the second set of optical channels are arranged in the consolidated, one-dimensional pattern,
wherein the first set of optical channels are arranged on a left side of the row, and
wherein the second set of optical channels are arranged on a right side of the row.

15. The optical device of claim 8, wherein the row of optical channels are disposed on the row of sensor elements via one or more adhesive layers.

16. An optical system comprising:
an optical sensor that includes a first set of sensor elements and a second set of sensor elements; and
an optical filter that includes a row of optical channels,
the optical filter including only one row of optical channels,
the row of optical channels being the one row of optical channels,
the row of optical channels including:
a first set of optical channels, and
a second set of optical channels,
the first set of optical channels and the second set of optical channels being arranged in one of:
an alternating, one-dimensional pattern, or
a consolidated, one-dimensional pattern,
a first optical channel, of the first set of optical channels, being disposed over a first sensor element of the first set of sensor elements, and
a second optical channel, of the second set of optical channels, being disposed over a second sensor element of the second set of sensor elements.

17. The optical system of claim 16,
wherein the first set of optical channels and the second set of optical channels are arranged in the alternating, one-dimensional pattern,
wherein the first set of sensor elements and the second set of sensor elements are arranged in a corresponding alternating, one-dimensional pattern that corresponds to the alternating, one-dimensional pattern,
wherein the first set of optical channels is disposed over the first set of sensor elements, and
wherein the second set of optical channels is disposed over the second set of sensor elements.

18. The optical system of claim 16, wherein the first optical channel is configured to pass first light associated with a subrange of a first wavelength range to the first sensor element, and
wherein the second optical channel is configured to pass second light associated with a subrange of a second wavelength range to the second sensor element.

19. The optical system of claim 16, wherein the first set of optical channels and the second set of optical channels are arranged in the consolidated, one-dimensional pattern,
   wherein the first set of optical channels are arranged on a first side of the row, and
   wherein the second set of optical channels are arranged on a second side of the row.

20. The optical system of claim 16, further comprising a mount that is configured to hold the optical filter over the optical sensor,
   wherein the mount causes the optical filter and the optical sensor to be separated by a free space gap.

* * * * *